United States Patent [19]
Hobbs

[11] Patent Number: 5,969,256
[45] Date of Patent: *Oct. 19, 1999

[54] MODULAR VIBRATION SYSTEM

[76] Inventor: Gregg K. Hobbs, 10218 Osceola Ct., Westminster, Colo. 80030

[*] Notice: This patent issued on a continued prosecution application filed under 37 CFR 1.53(d), and is subject to the twenty year patent term provisions of 35 U.S.C. 154(a)(2).

[21] Appl. No.: 08/773,384

[22] Filed: Dec. 26, 1996

[51] Int. Cl.$^6$ .................................................. B06B 3/00
[52] U.S. Cl. ................................. 73/663; 73/662
[58] Field of Search .......................... 73/663, 669, 662, 73/665, 666, 667, 668

[56] References Cited

U.S. PATENT DOCUMENTS

| | | | |
|---|---|---|---|
| 2,438,756 | 3/1948 | Larsen | 73/667 |
| 2,773,482 | 12/1956 | Dickie | 73/665 |
| 3,163,786 | 12/1964 | Dickinson | 73/668 |
| 3,217,531 | 11/1965 | Melton | 73/71.6 |
| 3,369,393 | 2/1968 | Farmer | 73/71.6 |
| 3,686,927 | 8/1972 | Scharton | 73/71.6 |
| 3,748,896 | 7/1973 | Barrows | 73/71.5 |
| 3,836,098 | 9/1974 | Miyashita | 244/17.27 |
| 3,945,246 | 3/1976 | Wadensten | 73/666 |
| 4,106,586 | 8/1978 | Stafford | 181/121 |
| 4,164,151 | 8/1979 | Nolan | 73/663 |
| 4,181,026 | 1/1980 | Abstein | 73/665 |
| 4,181,027 | 1/1980 | Talbott, Jr. | 73/665 |
| 4,181,028 | 1/1980 | Talbott, Jr. | 73/665 |
| 4,181,029 | 1/1980 | Talbott, Jr. | 73/665 |
| 4,403,511 | 9/1983 | Shibano et al. | 73/665 |
| 4,446,742 | 5/1984 | Thompson, Jr. | 73/663 |
| 4,537,077 | 8/1985 | Clark et al. | 73/665 |
| 4,633,716 | 1/1987 | Martin | 73/663 |
| 4,725,089 | 2/1988 | Langer | 296/37.12 |
| 4,735,089 | 4/1988 | Baker et al. | 73/663 |
| 4,925,198 | 5/1990 | Ito et al. | 280/89 |
| 5,024,096 | 6/1991 | Gregory et al. | 73/663 |
| 5,154,567 | 10/1992 | Baker et al. | 73/665 |
| 5,365,788 | 11/1994 | Hobbs | 73/665 |
| 5,412,991 | 5/1995 | Hobbs | 73/663 |
| 5,517,857 | 5/1996 | Hobbs | 73/571 |
| 5,540,109 | 7/1996 | Hobbs | 73/865.6 |
| 5,589,637 | 12/1996 | Hobbs | 73/663 |
| 5,594,177 | 1/1997 | Hanse | 73/663 |
| 5,675,098 | 10/1997 | Hobbs | 73/865.6 |
| 5,744,724 | 4/1998 | Hobbs | 73/665 |
| 5,836,202 | 11/1998 | Hobbs | 73/665 |

FOREIGN PATENT DOCUMENTS

| | | | |
|---|---|---|---|
| 2241348 | of 0000 | France | B06B 1/18 |
| 1367285 | 9/1974 | United Kingdom . | |
| 2063379 | 6/1981 | United Kingdom | F01B 11/00 |
| 2211268 | 6/1989 | United Kingdom | G01M 7/00 |

*Primary Examiner*—Hezron Williams
*Assistant Examiner*—Richard A. Moller
*Attorney, Agent, or Firm*—Greenlee, Winner and Sullivan, PC

[57] ABSTRACT

A modular vibration system which utilizes interchangeable modules to adapt to any of a wide range of applications and performance characteristics. The vibration system comprises a shaker module, a coupling module, and a fixture module. The shaker module includes features for mounting actuators, which provide multiaxial shaking motions, to the shaker module. The fixture module provides for attaching and holding specimens under test. The coupling module, preferably made of a visco-elastic material, couples the fixture module to the shaker module. The fixture module and the coupling module are easily separable from the shaker module. This configuration permits tuning the vibration system, over a wide range of multimodal coupling characteristics between the shaker module and the fixture module, for a specific application by interchanging fixture modules and coupling modules. The coupling characteristics can range from very flexible to very stiff and from underdamped to overdamped. The fixture module can range from a honeycomb structure which is lightweight and flexible to a solid structure which is very stiff. The thickness, shape and composition of the coupling module can be selected to adjust the damping and to provide further tuning of the stiffness. The vibration system can be held together by vacuum applied between the shaker module and fixture module or by tension members such as springs. In some cases the specimen itself can function as the fixture module.

31 Claims, 7 Drawing Sheets

MODULAR VIBRATION SYSTEM

This invention relates generally to the measuring and testing of products and more specifically to vibration and vibrator tables.

BACKGROUND OF THE INVENTION

Vibration systems, commonly known as shaker tables, are used for testing the vibration tolerance of manufactured products which are subjected to vibration in their operating environments or in shipping. For example, products used in vehicles and machinery are often subjected to high levels of vibration and require 10 testing to ensure their reliability under those conditions. Shaker tables are often used in the design, development and manufacturing of a product. They are used by development and testing laboratories and on assembly lines. It is also common for shaker tables to be mounted within, or protrude into, a thermal chamber to combine vibration with temperature cycling in the testing process. Since the testing of a product often includes the vibrating of components of a product, as well as the product itself, the generic object of a vibration test is hereinafter referred to as a specimen.

Some types of shaker tables, typically those providing vibrations in six axes, include a platform or mounting table upon which a specimen, or a fixture for attaching a specimen, is mounted. The table is usually mounted on flexible supports which permit it to vibrate freely and independently of the environment. Actuators, also known as exciters or vibrators, are attached to the table to produce vibrations. The table couples the vibrations from the actuators to the specimen.

Typically, in these types of tables, the actqator is an impact device which produces very high forces of very short duration. Very short duration, very high magnitude pulses in the time domain translate into broadband spectra in the frequency domain (as described mathematically by the Fourier Transform). The physical properties of the table cause it to respond to the different frequencies in the impact spectrum in different ways. In other words, the physical properties of the table can be ahosen to resonate with, or enhance the amplitude of, certain frequencies and to suppress others. The properties can cause the table to vibrate or ring (like a bell) at a particular frequency for a relatively long time, or to damp (or quench) the vibration in relatively short time. Also, depending on the location and orientation of the actuators attached to the table, as well as the dimensions and properties of the table, the table may have different modes of vibration. As used herein, a mode of vibration means a particular frequency, wavelength and orientation of vibration. For example, the center of a bar supported at its ends, when struck with a sharp impact, may vibrate at a particular frequency while the ends remain stationary. The bar may also be able to vibrate at another frequency such that a point near the center of the bar also remains stationary while the bar vibrates between the center and the ends. At other frequencies, there may be multiple stationary points along the length of the bar with vibrations occurring between each of the stationary points. Each of these conditions is referred to as a mode of vibration. The stationary points are called nodes and the points of maximum amplitude of vibration are called anti-nodes. The preceding describes multiple modes of vibration in one dimension. However, a shaker table has at least three dimensions if it comprises a single plate and may have more if it is a laminated structure having multiple layers of different materials. Hence, a shaker table may have many modes of vibration in each of multiple dimensions. Since an impact produces a broad range of frequencies, it can excite many modes of vibration in a shaker table. The properties of the table can be selected to enhance or suppress particular modes of vibration and thereby tune the behavior of the table.

Shaker tables have been designed and built with many various combinations of dimensions, layers and materials for the purpose of producing and tuning multimodal vibrating characteristics to meet the testing requirements of specimens ranging from semiconductor devices to spacecraft. Tables have ranged from very stiff structures with very little damping to very flexible structures which are heavily damped.

U.S. Pat. No. 3,369,393 (1968), to E. W. Farmer, describes a light weight, stiff test fixture comprising upper and lower horizontal plates separated by perpendicular vertical walls. The walls are arranged on a horizontal grid pattern to form cells which may have different horizontal dimensions. The lower plate is attached to an actuator for providing shaking motions. The upper plate provides a mounting surface for specimens. The fixture provides a dynamically stiff coupling between the upper and lower plates over a frequency range of interest.

U.S. Pat. No. 3,686,927 (1972), to Terry D. Sharton, discloses light weight, flexible test fixtures having various dynamic behaviors. The test fixtures comprise first and second members coupled by a system of flexible members. The first member is attached to an actuator fir providing shaking motions. The second member provides for mounting the specimens. The flexible members are chosen to provide a desired dynamic coupling fun ion between the first and second members. The flexible members described include systems of wires, beams, plates and trusses.

U.S. Pat. Nos. 4,181,027, 4,181,028 and 4,181,029 (1980) to C. F. Talbott, Jr., describe vibrating systems comprising a driving structure, a visco-elaptic structure coupled to the driving structure, and a driven structure coupled to the visco-elastic structure. The driving structure is caused to vibrate by pneumatic actuators. The specimens are mounted on the driven structure. The visco-elastic structure couples the vibration of the driving structure to the driven structure and in turn to the specimens. These patents describe various ways of clamping the driving and driven structures together, including springs, bolts and pneumatic devices. various ways of altering the stiffness and damping characteristics of the visco-elastic material are also described, including heating and cooling of the material.

U.S. Pat. No. 4,735,089 to Richard L. Baker, et al., (1988) describes a shaker table comprising a table base, a plurality of damping layers mounted on the table base, and a table top mounted on the damping layers. Vibrating assemblies apply vibrating motions to the table base. The specimens are mounted on the table top. The damping layers provide dynamic coupling between the table base and the table top. The damping layers comprise laminated panels of honeycomb bonded together with a flexible adhesive. The table top is segmented into a plurality of sections.

U.S. Pat. No. 5,412,991 (1995) to Gregg K. Hobbs describes a stiff shaker table comprising a thick stiff plate having multiple internal weight-reducing cavities. Specimens are mounted on the plate. Vibrating actuators are attached tb the plate to provide vibrating motion. An embodiment using a closed-cell honeycomb panel in place of the plate is also described.

The previously described inventions disclose shaker table designs with structures ranging from stiff to flexible and with various levels of damping. Some also describe ways of modifying the table design to change the performance characteristics of the table. Others describe control systems for dynamically varying actuator operation or for varying the preloading or temperature of the visco-elastic material. In each of these inventions, the table structures are practically fixed by the design and are not easily changed. However, it is often necessary or desirable to test specimens of substantially different sizes, weights and dynamic behaviors under widely varying test conditions. Consequently it is desirable to have a vibration system which can be quickly and easily modified to adapt to the testing requirements of different specimens.

It is therefore an object of the present invention to provide a modular vibration system which can be easily adapted to testing any of a large variety of specimens under a wide range of conditions by the use of interchangeable system components or modules.

SUMMARY OF THE INVENTION

The invention is a modular vibration system which can be easily adapted to any of a wide range of applications and performance characteristics by interchanging modules. The vibration system comprises a shaker module, a coupling module, and a fixture module. The shaker module is preferably a plate usually mounted on a flexible mounting system permitting movement over a limited range on multiple axes, including both linear and rotational axes. The shaker module can be a solid structure or a lightweight structure of either stiff or flexible design. The shaker module includes features for mounting actuators which apply forces, preferably impact forces, to the shaker module. The fixture module is preferably a plate which provides for attaching and holding the specimens. The coupling module, preferably made of a visco-elastic material, couples the fixture module to the shaker module and is easily separable from one or both of the shaker and fixture modules. Preferably the coupling module is clamped between the fixture module and the shaker module. As used herein, the word lamp (and its variations) refers to the pressing of the fixture aid-shaker modules toward each other. This construction permits the system to provide any of a wide range of multimodal coupling characteristics between the shaker module and the fixture module. The coupling characteristics can range from very flexible to very stiff and from underdamped to overdamped. For example, the fixture mpdule can be a honeycomb structure which is light-weight and flexible or it can be a solid structure which is heavy and very stiff. Also for example, it can be a waffle structure which is lighter in weight and almost as stiff as a solid structure. As used herein, the word waffle describes a planar structure having regions of different thickness. For example, a waffle structure could be a panel of a first thickness having an integral grid pattern of ribs of a second thickness superimposed upon one or both sides of the panel. The orientation of the walls of a honeycomb or the grid pattern of a waffle structure can be chosen to produce different modes of vibration in different directions. The thickness, shape and composition of a coupling module can be selected to adjust the damping and to provide further tuning of the flexibility (or, conversely, the stiffness) of the system. In one embodiment, the system is held together by vacuum applied between the shaker and fixture modules, and in another embodiment, by tension members such as bolts, springs or pneumatic devices. In the embodiment using vacuum, the coupling module may also function as a gasket or seal between the modules. The invention allows the use of interchangeable prefabricated fixture modules and coupling modules to quickly and easily adapt the vibration system to different applications and specimens. In either embodiment, the fixture module may consist of the specimen itself when the specimen is a large assembly having suitable dynamic characteristics. When the specimen is sufficiently large, the system may be supported by the specimen instead of its own flexible mounting system.

DESCRIPTION OF THE PREFERRED EMBODIMENT

Figure 1:
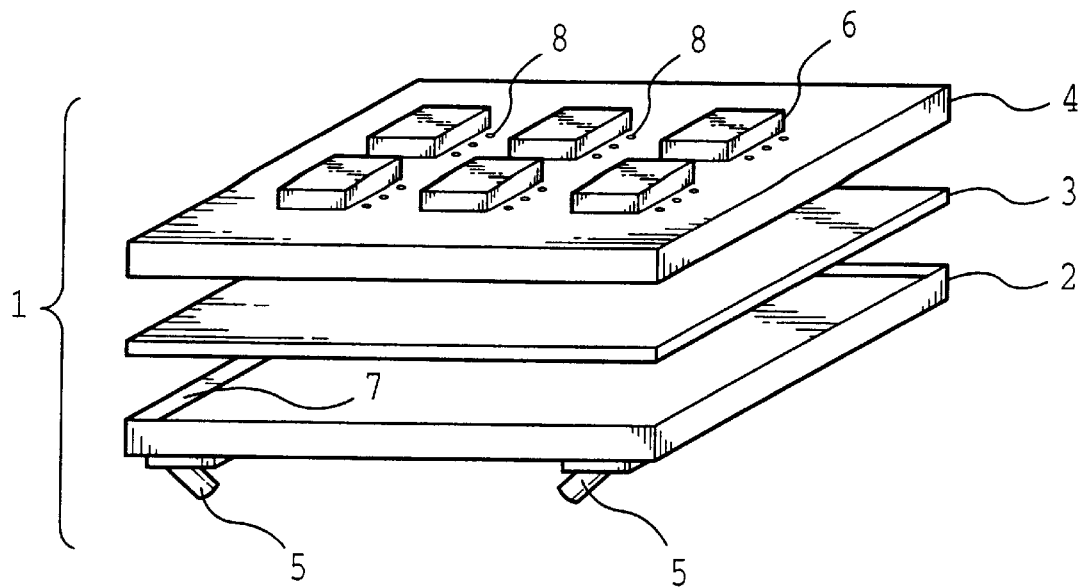
FIG. 1 is a perspective view of the basic vibration system.

In the drawings, like reference numerals indicate like features; and, a reference numeral appearing in more than one figure refers to the same element. The drawings and the following detailed descriptions show specific embodiments of the invention. Numerous specific details including materials, dimensions, and products are provided to enable a more thorough understanding of the invention. However, it will be obvious to one skilled in the art that the present invention may be practiced without these specific details.

The invention is a modular vibration system comprising a shaker module having features for mounting actuators or exciters, an interchangeable fixture module having provisions for mounting specimens, and an interchangeable coupling module between the fixture module and the shaker module. When the shaker module is vibrated, the coupling module in combination with the fixture and shaker modules applies multi-axis and multi-modal vibrations to the specimens.

FIG. 1 shows an exploded view of the basic configuration of the vibration system of the invention. Vibration system 1 comprises three basic elements or modules: shaker module 2, coupling module 3 and fixture module 4. Shaker module 2 is supported by flexible supports (not shown) which provide freedom of movement of shaker module 2 over a limited range in multiple directions. Multiple actuators 5 can be attached to shaker module 2 with different orientations to produce multiaxial and multidirectional vibrations of shaker module 2. Coupling module 3 rests on shaker module 2 and supports fixture module 4. The specimens 6 to be vibrated by vibration system 1 are mounted on fixture module 4 utilizing specimen mounting provisions 8. In operation, coupling module 3 couples the vibrations of shaker module 2 to fixture module 4 and in turn to specimens 6. A rim 7 can be provided on shaker module 2 if necessary for retaining coupling module 3 in place during vibration. A similar rim (not shown) can be provided on the bottom of fixture module 4 for maintaining alignment of fixture module 4 and coupling module 3.

A salient feature of the invention is that fixture module 4 and coupling module 3 are removeably mounted on shaker module 2. In this way, each member of a family of fixture modules 4 and coupling modules 3 can be customiod to the properties and testing requirements of a specific type of specimen 6. Then by choosing an appropriate combination of fixture module 4 and coupling module 3, vibration system 1 can be configured to meet a particular set of testing requirements. In operation, shaker module 2 and fixture module 4 are pressed together, preferably by vacuum or mechanical tension members such as springs or bolts, compressing coupling module 3 between them in sandwich fashion.

Figure 2:
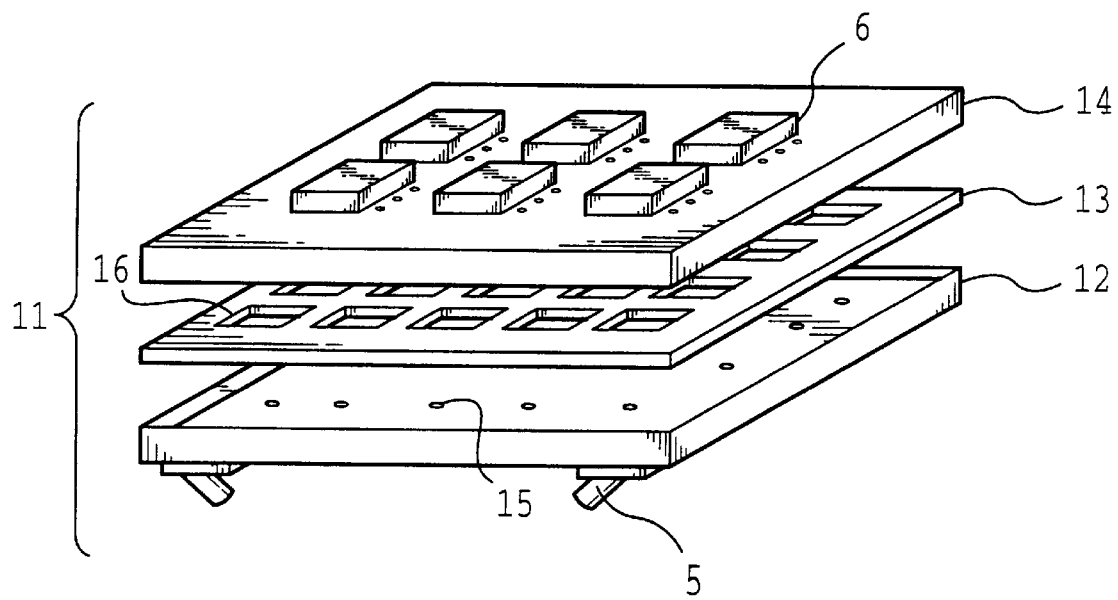
FIG. 2 shows a vibration system with a vacuum clamp.

FIG. 2 shows an exploded view of a vibration system held together during operation by vacuum. In this embodiment, vacuum system 11 comprises vacuum shaker module 12, vacuum coupling module 13 and vacuum fixture module 14. Shaker module 12 has one or more vacuum holes 15 connected to a vacuum source (not shown). Coupling module 13 has one or more apertures 16 which have access to vacuum holes 15. The bottom surface of fixture module 14 is closed in the areas over apertures 16. Apertures 16, closed at the bottom by shaker module 12 and at the top by fixture module 14, provide vacuum chambers which, when a vacuum is applied through holes 15, cause shaker module 12 and fixture module 14 to be drawn together thereby compressing coupling module 13. In this embodiment, vibration system 11 can be configured for a particular set of requirements by choosing an appropriate coupling module 13, stacking it on shaker module 12, choosing an appropriate fixture module 14, stacking it on module 13, and applying vacuum to holes 15.

Figure 3:
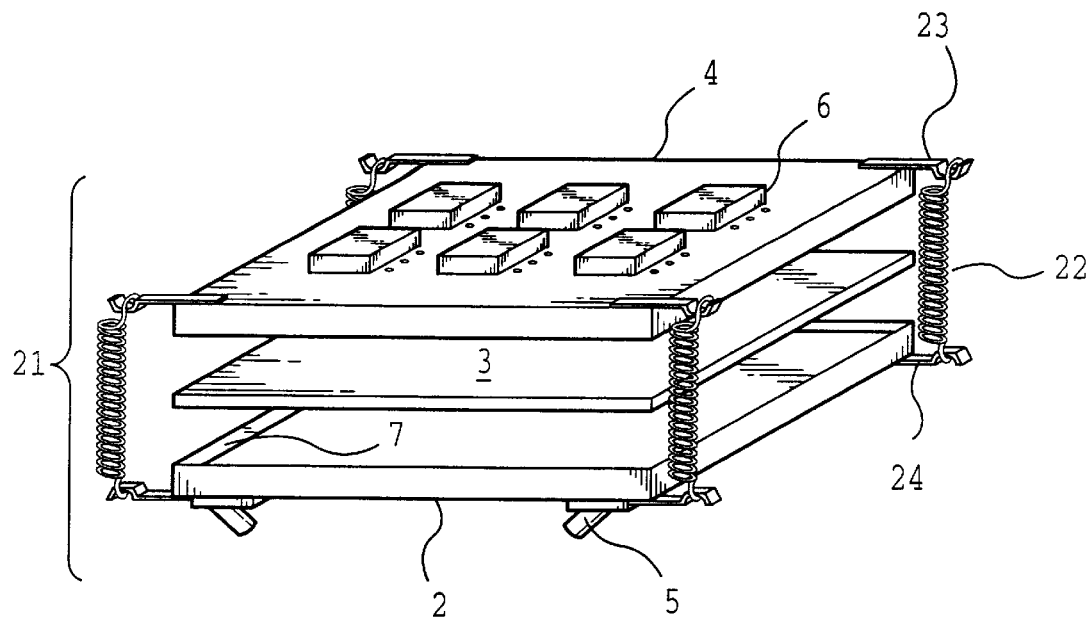
FIG. 3 shows a vibration system with a tension clamp.

FIG. 3 shows an exploded view of a vibration system held together during operation by tension members. In this embodiment, tension system 21 comprises shaker module 2, coupling module 3 and fixture module 4. Tension members 22, represented here as springs, are connected between fixture module 4 and shaker module 2 utilizing upper brackets 23 and lower brackets 24, respectively. In this embodiment, vibration system 21 can be configured for a set of requirements by choosing an appropriate coupling module 3, stacking it on shaker module 2, choosing an appropriate fixture module 4, stacking it on module 3, and connecting tension members 22 to apply tension between shaker module 2 and fixture module 4. Although tension members 22 are represented by springs in FIG. 3, many other devices well known in the art can be used as well. For example, in addition to a huge variety of steel springs, bolts and combinations thereof, pneumatic devices such as gas cylinders (including air and vacuum cylinders and "gas springs") can be used as tension members as well as members made of various elastic materials such as rubber. Tension members can also include hydraulic devices, such as hydraulic cylinders, either independently or as combination gas and hydraulic devices which can provide both spring-like forces and damping characteristics. Also, as is well known in the art, a tension member may comprise a compression member acting through a link; e.g., a coil spring compressed by a bolt.

Figure 4:
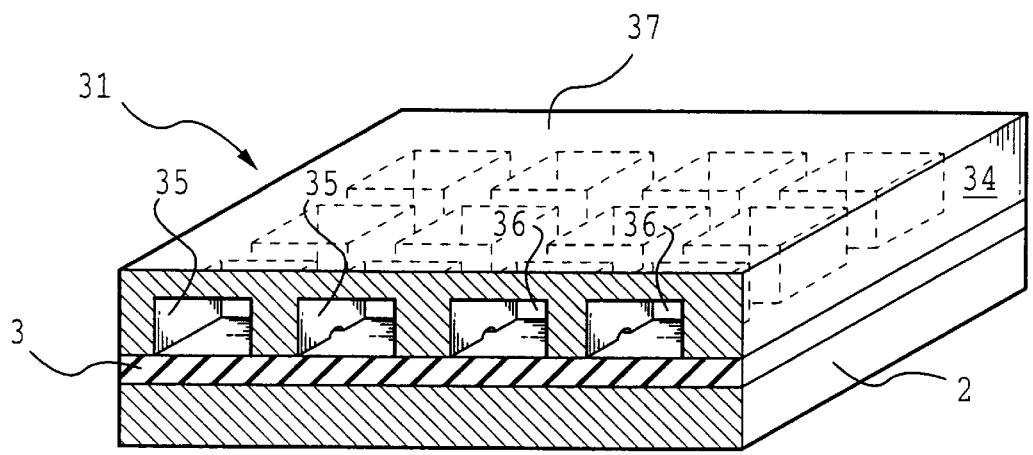
FIG. 4 shows a waffle style fixture module.

Fixture modules can have many different forms, each form adapted to the properties and testing requirements of a particular specimen or class of specimens. Likewise, coupling modules can also have different forms, each form adapted to a particular set of properties and requirements. FIG. 4 shows a cross sectional view of a vibration system configuration comprising shaker module 2, coupling module 3, and waffle fixture module 34. Waffle fixture module 34 comprises a thin panel having an upper surface 37, for mounting specimens, and lower surface comprising a grid pattern of integral ribs 35 and 36. Coupling module 3 is a sheet of visco-elastic material compressed between ribs 35 and 36 and shaker module 2. The upper surface 37 of module 34 may also be ribbed if desired and specimen mounting requirements permit.

Figure 5:
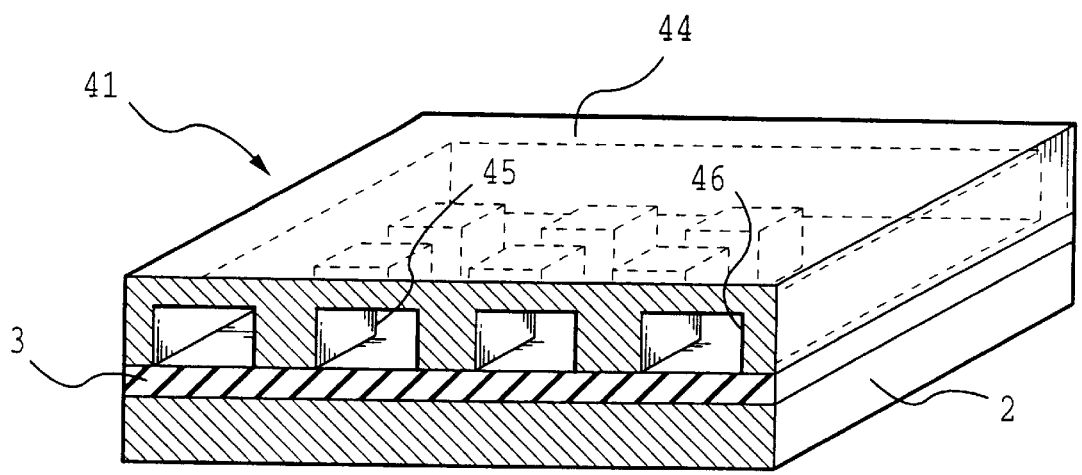
FIG. 5 shows a post style fixture module.

FIG. 5 shows a similar cross sectional view of a vibration system configuration comprising shaker module 2, coupling module 3 and post fixture module 44. Although fixture module 44 is also a waffle structure, it is different from fixture module 34 in that it has a lower surface comprising posts 45 and ribs 46. Posts 45 are shown in this view as having rectangular cross sections (foot-prints); however, it will be obvious to those skilled in the art that the posts can have other shapes including round, elliptical, square, triangular, or winged as in the letters "X" or "y"

Figure 6:
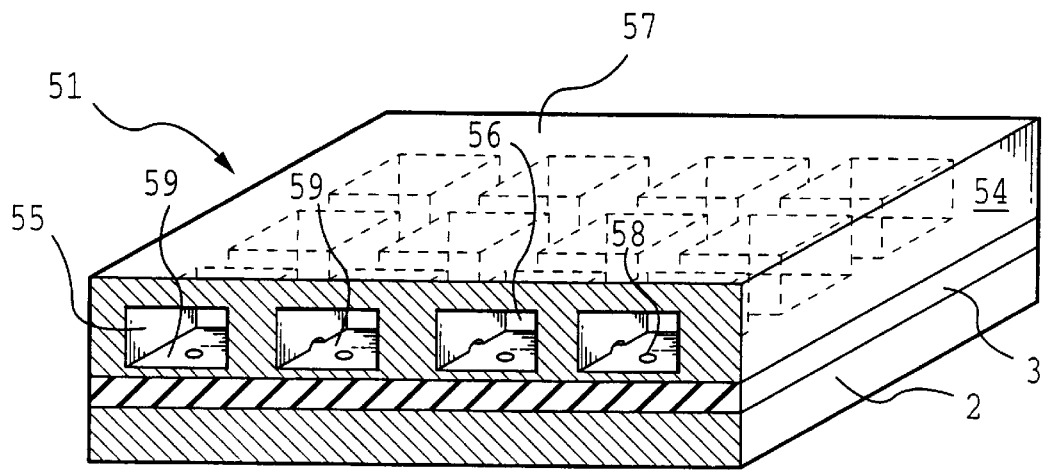
FIG. 6 shows a hollow style fixture module.

Either waffle fixture module 34 of FIG. 4 or post fixture module 44 of FIG. 5 can be closed at the bottom by an integral or rigidly attached panel which provides a lower surface similar to the upper surface. The panel may be flat or similar in shape to module 34 or module 44 (respectively) inverted. As shown in the cross sectional view 51 of FIG. 6, hollow fixture module 54 could have inner cavities bounded by upper panel 57, lower panel 59, and ribs 55 and 56. One or both upper and lower panels 57 and 59 could have holes or openings 58 into the inner cavities. The result is a fixture module having a hollow structure comprising outer panels 57 and 59 separated by an internal waffle structure comprising ribs 55 and 56, or an internal structure comprising posts 45 and ribs 46 as shown in FIG. 5.

Figure 7:
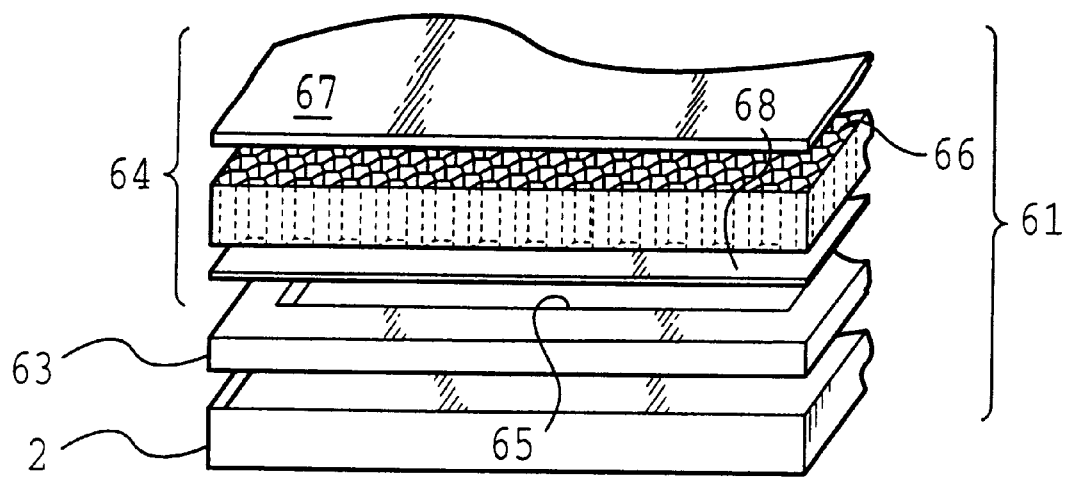
FIG. 7 shows a honeycomb style fixture module.

An exploded perspective view of a vibration system configuration having a lightweight honeycomb style fixture module is shown in FIG. 7. Honeycomb configuration 61 comprises shaker module 2, coupling module 63, and honeycomb fixture module 64. Coupling module 63 is shown as having a single large aperture 65 as an example of an alternative style of coupling module; however, coupling module 63 could alternatively have no aperture as in coupling module 3 of FIG. 1 or multiple apertures as in coupling module 13 of FIG. 2. The style of coupling module used is dependent on the type (e.g. vacuum or tension member) and application of the vibration system, the properties of the specimen, and the style of fixture module. Fixture module 64 comprises honeycomb section 66 and upper and lower face plates 67 and 68, respectively. Preferably, plates 67 and 68 are rigidly attached, by methods well known in the art, to honeycomb section 66 to provide stiffness to fixture module 64. Plate 67 also provides a mounting surface for specimens. In a vacuum system embodiment, plate 68 provides a solid surface which, in combination with shaker module 2 and the aperture in coupling module 63, forms a vacuum chamber for providing a force on fixture module 64 to compress coupling module 63. However, those skilled in the art will recognize that plates 67 and 68 may have other forms which will perform the desired function. For example, to form a vacuum chamber, it is only necessary for one, or portions of one, of the plates to be solid. And, under certain conditions, only one plate may be required.

Figure 8:
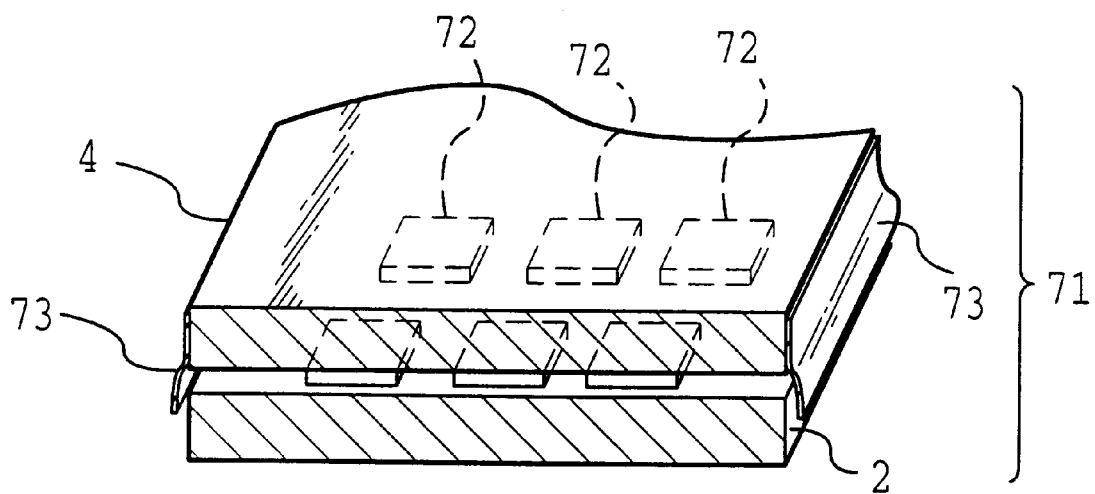
FIG. 8 shows a fixture module with a skirt seal.
Figure 9:
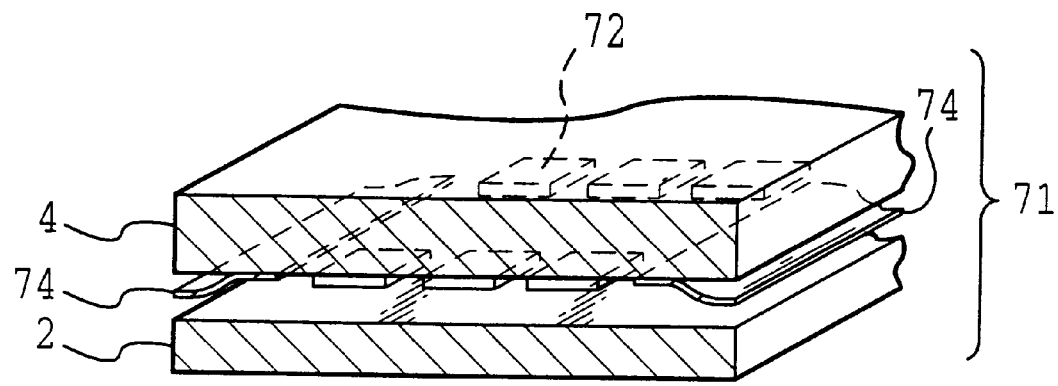
FIG. 9 shows a fixture module with a flange seal.
Figure 10:
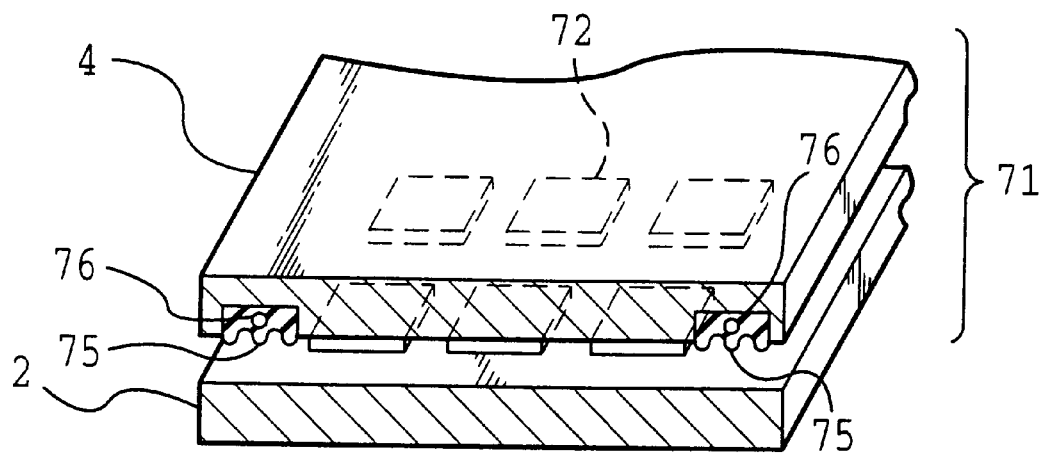
FIG. 10 shows a fixture module with an inflatable seal.

FIGS. 8–10 are exploded cross-sectional views illustrating various types of vacuum seals in combination with another alternative style of coupling module. FIG. 8 shows a vibration system comprising shaker module 2, fixture module 4, and a coupling module comprising multiple blocks 72. The number, shape and thickness of blocks 72, along with the properties of the material used, are determined by the coupling properties required of the coupling module as described previously. A vacuum seal is provided by a skirt 73, attached and sealed to the perimeter edges of fixture module 4, and extending downward to overlap the perimeter edges of shaker module 2. When a vacuum is applied between shaker module 2 and fixture module 4, air flow between skirt 73 and the edges of shaker module 2 produces a lower air pressure in that area (Bernoulli effect) and draws the skirt 73 against the edges of module 2 providing a vacuum seal. Alternatively, skirt 73 could be attached to shaker module 2 and extended upward to seal against fixture module 4.

FIG. 9 shows a flange seal 74 attached and sealed to the perimeter of the bottom of fixture module 4. As described in the preceding paragraph, air flow between seal 74 and shaker module 2 causes seal 74 to be drawn to module 2 thereby providing a vacuum seal. Alternatively, seal 74 could be attached to shaker module 2 and drawn to fixture module 4 by air flow between module 4 and seal 74.

FIG. 10 shows an inflatable compliant seal 75 embedded and sealed into the bottom perimeter of fixture module 4. Seal 75 has a hollow passage 76 which can be connected to a source of a fluid, which can be either a gas or a liquid. By forcing the fluid under pressure into passage 76, seal 75 can be expanded to fill the space between seal 75 and shaker module 2. By varying the pressure applied to the fluid in passage 76, the degree of compression of blocks 72 can be varied and thereby the coupling properties of blocks 72, in combination with seal 75, can be altered. Also, by using fluids of different viscosities, the damping properties of the seal 75 in combination with blocks 72 can be altered. Although in the preceding descriptions multiple blocks 72 of coupling material are shown, it will be recognized by those skilled in the art that the number, size, shape and material of blocks 72 can be altered to meet the requirements of particular applications or specimens.

Figure 11:
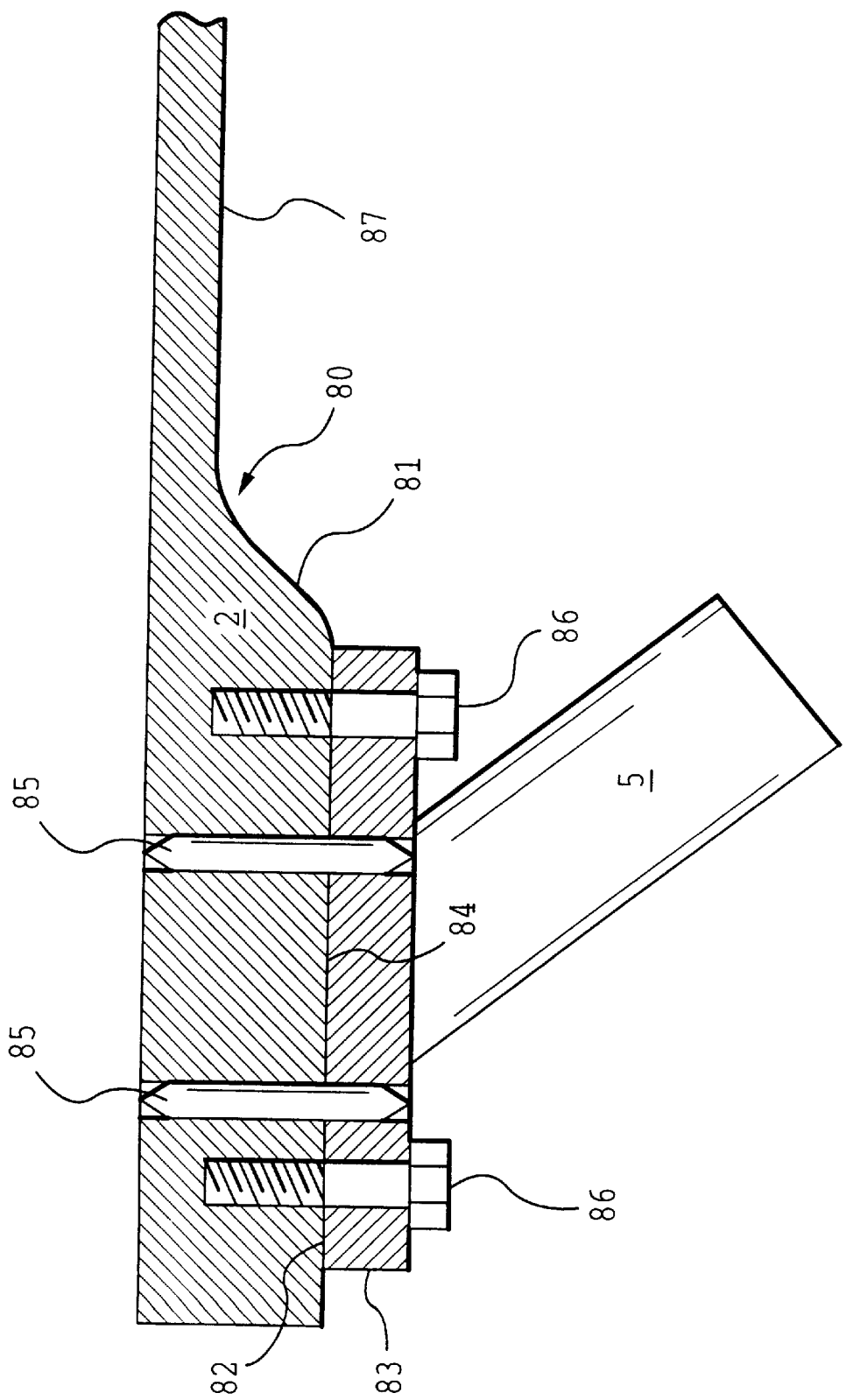
FIG. 11 shows actuator mounting features on a shaker module.

FIG. 11 is a cross sectional view of a shaker module showing an actuator mounting feature 80. Shaker module 2 comprises a thin area 87 and at least one boss 81 having a greater thickness. Boss 81 includes an actuator mounting surface 82. Actuator 5 has a base 83 and a base surface 84 for mounting actuator 5 on a surface such as surface 82. Boss 81 and base 83 are line drilled to receive alignment pins 85 which extend at least partially through both boss 81 and base 83. Pins 85 are tightly fitted into boss 81 and base 83 to prevent any relative motion between surfaces 84 and 82. Boss 81 is also drilled and tapped to receive actuator mounting bolts 86 which clamp surface 84 of actuator 5 to surface 82 of boss 81. Boss 81 serves as a load spreader to distribute the impact forces produced by the actuator 5. Since these forces may reach values in the range of 60,000 pounds, it is necessary to provide a very solid mounting feature for the actuator to prevent localized stress values sufficient to cause fatigue failure of the shaker module. Also, although area 87 is shown in FIG. 10 as having uniform thickness, it may be necessary for reasons of dynamic stiffness or stress relief to provide reinforcing or stiffening ribs such as in the waffle structure described for FIG. 4 above.

Figure 12:
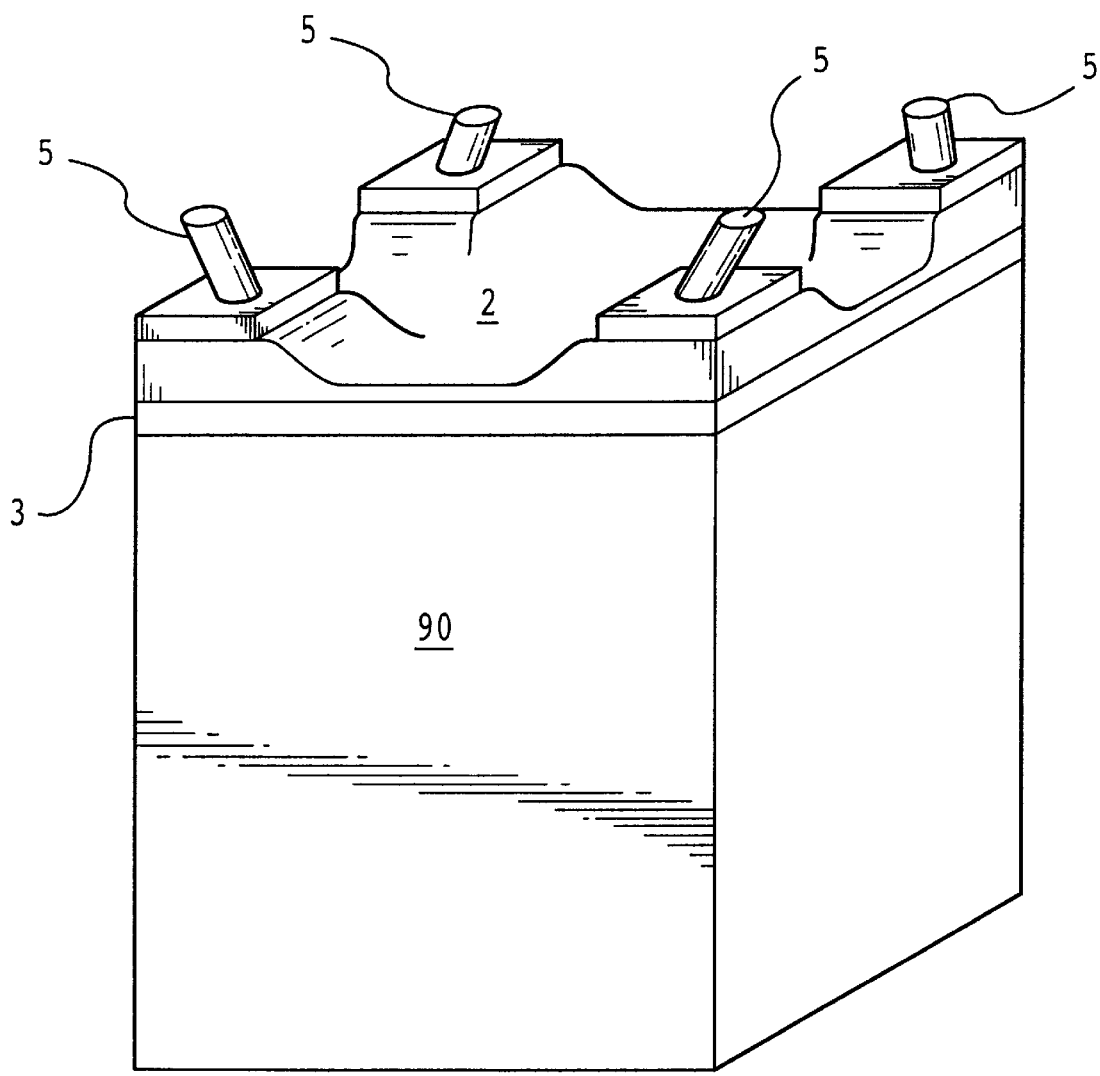
FIG. 12 shows a vibration system attached to a large specimen.

FIG. 12 shows a perspective view of an embodiment wherein the vibration system comprises shaker module 2, coupling module 3 and specimen 90. In this embodiment, specimen 90 behaves as the fixture module. Typically, specimen 90 is a large assembly containing component parts. For example, it may be subassembly for a spacecraft or an enclosure for electronic equipment used in aircraft, boats or land vehicles. During testing, depending on the nature of the test, specimen 90 may be mounted on flexible supports (not shown) or on the type of mounting to be used by specimen 90 at its final installation. In this case, shaker module 2 and coupling module 3 are clamped to specimen 90 by vacuum or tension members as previously described and no flexible supports for shaker module 2 are required. However, if specimen 90 is sufficiently small it may simply replace the generic fixture module 4 shown in FIG. 1. For example, a small specimen (having a flat surface suitable for sealing against an appropriately shaped coupling module) can be substituted for fixture module 14 in FIG. 2 and held by vacuum for quick replacement as each test is completed. Also, in special cases, shaker module 2 can be attached directly to specimen 90 without the use of either fixture module 4 or coupling module 3. In cases where the fixture module, or both the fixture module and the coupling module, are replaced by the specimen, the dynamic properties of the specimen must be known, and possibly controlled during its manufacture, to ensure that the performance of the vibration system is predictable. However, this does not preclude empirical determination of such properties during vibration testing.

The fixture modules and coupling modules preferably are prefabricated and can be easily interchanged when necessary to modify the dynamic characteristics of the vibration system thereby allowing wide ranges of spectrum, bandwidth and vibration levels to be attained from one vibration system design. However, the fixture modules and coupling modules can also be custom-made or altered at the beginning of a test or may evolve during a test. Interchangeable fixture modules and coupling modules also provide the advantage of being relatively inexpensive and easily replaced when worn or damaged.

The vibration system is tunable in that the fixture module-coupling module-shaker module combination can be made to be very flexible or very stiff by using various fixture module and coupling module designs with a single vibration system design. The system design can use vacuum or tension member clamping of the fixture module to the shaker module. In the tension member case, the members should tie the fixture module to the shaker module with a force applied substantially normal to the plane of the modules and should not provide a strong shear tie, i.e., a stiff tangential reaction force parallel to the planes of the modules, unless a very stiff system is desired. Preferably the clamping forces, once chosen, are substantially constant over the range of deflection of the coupling module while in operation. Maintaining substantially constant clamping forces permits the spring rates and coupling characteristics of the different coupling modules to be independent of the clamping method. Constant forces can be obtained with vacuum clamping by maintaining constant pressure differences between the vacuum and the ambient air. In the case of tension members, sufficiently constant forces can be obtained by preloading the tension members. Increasing or decreasing the clamping force (i.e., the force compressing the coupling module) via vacuum changes, or via tension changes in the case of mechanical clamping, can vary the vibration system's dynamic behavior. For example, changes in the clamping forces can be used to vary the amount of damping in the system's bending modes.

The deflection properties of the different fixture modules can range from very stiff to very flexible and, in combination with the coupling and damping properties of different coupling modules, can provide wide ranges of vibration frequency spectra and amplitudes. The damping of the system can be adjusted by selecting different materials, shapes and thicknesses for the coupling module. The coupling module also functions as both a compression and a shear tie from the shaker module to the fixture module. As such, the damping properties of the coupling module generally provide the damping for the system. The preferable material for the coupling module is a visco-kelastic material which can range from nearly elastic to nearly viscous, with values between being attainable by appropriate selections of materials and dimensions. A very versatile such material is fluorosilicone rubber, which is adaptable to many situations because of its good elasticity and damping properties at both high and low temperatures, its sticky nature, (i.e., high coefficient of friction against other materials such as aluminum), and its wide range of damping properties, particularly in shear. However, many other materials known in the art can be used to extend the range of available behavior.

The coupling module can be attached to the fixture module allowing the dynamic properties of the system to be determined by a particular fixture module and coupling module combination which is unique tp a particular application or type of specimen. That is, the vibration system can be tuned to a particular application by selecting a single fixture module and coupling module assembly rather than selecting from separate fixture modules and coupling modules. Also, in some applications, when the fixture module and the specimen provide sufficient damping, the system can be operated without a coupling module by clamping the fixture module directly to the shaker module.

For a vibration system having a low frequency bandwidth and heavy damping in the resonant modes, a flexible fixture module can be used in combination with a relatively thick, or soft, visco-elastic coupling module. For example, the fixture module can be made of metal, composite material or plastic in a honeycomb, waffle or porous structure. The thick coupling module provides a flexible shear tie between the shaker module and the fixture module. This configuration has low resonant frequencies and a sharp rolloff above the first few resonant frequencies.

For a system having a high bandwidth and high vibration amplitudes, a fixture module having a high stiffness to mass ratio can be used in combination with a relatively thin, or hard, visco-elastic coupling module. For example, such a fixture module can be a thick magnesium, aluminum, steel or titanium plate with hollow interior cavities, a waffle structure, or a honeycomb structure with a thicker than normal (for honeycomb) face plate.

Intermediately stiff designs can be obtained by choosing fixture modules and coupling modules each having properties between very stiff and very flexible or by choosing combinations such as a stiff fixture module and a soft coupling module or vice versa.

The frequency and amplitude ranges of vibration can be changed by changing the mass of some, or all, of the vibrating elements. For example, amplitudes below the minimum operating amplitudes of some actuators can only be obtained by increasing the mass of the vibrating elements. When testing products such as relatively fragile computer hard disk drives on a system designed for also testing more robust products, a very heavy fixture module provides sufficient mass loading to limit the vibration amplitudes to acceptable levels.

Moderate amounts of frequency spectrum shaping can be accomplished by placement of the actuators as well as by adjusting the impact repetition rates of the actuators. For example, a mode of vibration can be subdued by placing the actuator at a node of that mode and can be enhanced by placing the actuator at an antinode of that mode.

In summary, the invention provides a modular vibration system which can be adapted to any of a wide range of specimens and applications by the interchanging of fixture modules and coupling modules.

While the invention has been described above with respect to specific embodiments, it will be understood by those of ordinary skill in the art that various changes in form and details may be made therein without departing from the spirit and scope of the invention.

I claim:

1. A modular vibration system, for subjecting a specimen to vibration, comprising:
    a shaker module having an actuator mounted thereon, said actuator for applying an impact force to said shaker module;
    a fixture module; and
    a coupling module, clamped between said shaker module and said fixture module by a substantially constant clamping force;
    wherein said coupling module is separable from at least one of said fixture module and said shaker module.

2. The vibration system of claim 1 wherein said fixture module and said coupling module in combination have vibration transfer characteristics specific to said specimen.

3. The vibration system of claim 1 wherein said clamping force is provided by a vacuum.

4. The vibration system of claim 3 wherein said coupling module provides a vacuum seal.

5. The vibration system of claim 3 further comprising a skirt surrounding, and providing a vacuum seal between, said shaker module and said fixture module.

6. The vibration system of claim 3 further comprising a flange seal between the perimeters of, and providing a vacuum seal between, said shaker module and said fixture module.

7. The vibration system of claim 3 wherein said coupling module comprises an inflatable seal between said shaker module and said fixture module.

8. The vibration system of claim 1 wherein said clamping force is provided by a tension member.

9. The vibration system of claim 8 wherein said tension member comprises a spring.

10. The vibration system of claim 8 wherein said tension member comprises a pneumatic device.

11. The vibration system of claim 8 wherein said tension member comprises a hydraulic device.

12. The vibration system of claim 8 wherein said tension member comprises an elastic material.

13. The vibration system of claim 1 wherein said shaker module includes an actuator mounting feature adapted to receive alignment pins.

14. The vibration system of claim 1 wherein said fixture module includes a honeycomb structure.

15. The vibration system of claim 1 wherein said fixture module comprises a waffle structure.

16. The vibration system of claim 1 wherein said fixture module includes a hollow structure comprising panels separated by a waffle structure.

17. The vibration system of claim 1 wherein said fixture module comprises said specimen.

18. The vibration system of claim 1 wherein said coupling module is made of a visco-elastic material.

19. The vibration system of claim 18 wherein said visco-elastic material is fluorosilicone rubber.

20. A method of subjecting a specimen to vibration, comprising the steps of:
    providing a shaker module having an actuator mounted thereon;

providing a fixture module and a coupling module, the coupling module being separable from at least one of the fixture module and the shaker module;

attaching the specimen to the fixture module;

clamping the coupling module between the shaker module and the fixture module by application of a substantially constant clamping force;

applying an impact force from the actuator to the shaker module; and coupling a vibration from the shaker module to the specimen through the coupling module and fixture module.

21. The method of claim 20 wherein the coupling module is made of a visco-elastic material.

22. The method of claim 20 wherein the fixture module comprises the specimen.

23. The method of claim 20, further comprising the steps of:

locating a node, or an antinode, of a mode of vibration; and attaching an actuator to the shaker module at the node, or at the antinode.

24. The method of claim 20 wherein the clamping force is provided by a vacuum.

25. The method of claim 20 wherein the clamping force is provided by a tension member.

26. A method of subjecting a specimen to vibration, comprising the steps of:

providing a shaker module having an actuator mounted thereon;

providing a fixture module; attaching the specimen to the fixture module;

removably clamping the fixture module to the shaker module by application of a substantially constant clamping force;

applying an impact force from the actuator to the shaker module; and coupling a vibration from the shaker module to the specimen through the fixture module.

27. The method of claim 26, further comprising the steps of:

locating a node, or an antinode, of a mode of vibration; and attaching an actuator to the shaker module at the node, or at the antinode.

28. A method of subjecting a specimen to vibration, comprising the steps of:

providing a shaker module having an actuator mounted thereon;

separably clamping the shaker module to, and supporting the shaker module by, the specimen;

applying an impact force from the actuator to the shaker module; and applying a vibration from the shaker module to the specimen.

29. A modular vibration system, for subjecting a specimen to vibration, comprising:

a shaker module having an actuator mounted thereon, said actuator for applying an impact force to said shaker module;

a fixture module;

a coupling module, clamped between said shaker module and said fixture module; and means for removably clamping said fixture module to said shaker module with substantially constant force.

30. The vibration system of claim 29 wherein said means comprises a vacuum.

31. The vibration system of claim 29 wherein said means comprises a tension member.

* * * * *